(12) United States Patent  (10) Patent No.: US 8,506,834 B2
Yamada et al.  (45) Date of Patent: Aug. 13, 2013

(54) METHOD FOR DRY ETCHING $Al_2O_3$ FILM

(75) Inventors: Kentaro Yamada, Shunan (JP); Takeshi Shimada, Hikari (JP); Kotaro Fujimoto, Kudamatsu (JP)

(73) Assignee: Hitachi High-Technologies Corporation, Tokyo (JP)

( * ) Notice: Subject to any disclaimer, the term of this patent is extended or adjusted under 35 U.S.C. 154(b) by 1295 days.

(21) Appl. No.: 12/022,207

(22) Filed: Jan. 30, 2008

(65) Prior Publication Data

US 2009/0078676 A1    Mar. 26, 2009

(30) Foreign Application Priority Data

Sep. 26, 2007 (JP) .................................. 2007-249429

(51) Int. Cl.
*C23F 1/00* (2006.01)
*B44C 1/22* (2006.01)

(52) U.S. Cl.
USPC .................... 216/58; 216/47; 216/51; 216/67

(58) Field of Classification Search
USPC .......................................... 216/47, 51, 58, 67
See application file for complete search history.

(56) References Cited

U.S. PATENT DOCUMENTS

| | | | |
|---|---|---|---|
| 6,432,835 B1 * | 8/2002 | Yunogami et al. | 438/720 |
| 2003/0170998 A1 * | 9/2003 | Mise et al. | 438/710 |
| 2004/0097046 A1 * | 5/2004 | Maruyama et al. | 438/294 |
| 2004/0198065 A1 * | 10/2004 | Lee et al. | 438/725 |
| 2005/0118762 A1 * | 6/2005 | Nakamura et al. | 438/253 |
| 2008/0297945 A1 * | 12/2008 | Han et al. | 360/125.3 |

* cited by examiner

*Primary Examiner* — Shamim Ahmed

(74) *Attorney, Agent, or Firm* — Antonelli, Terry, Stout & Kraus, LLP

(57) ABSTRACT

The invention provides a dry etching method for processing a wafer having an Ru film formed on a thick $Al_2O_3$ film to be used for a magnetic head, capable of realizing high selectivity. In the etching of a wafer having disposed on an NiCr film 15 an $Al_2O_3$ film 14, an Ru film 13, an $SiO_2$ film 12 and a resist mask 11, the Ru film 13 is etched via plasma using a processing gas containing $Cl_2$ and $O_2$ (FIG. 1(*c*)), and thereafter, the Ru film 13 is used as a mask to etch the $Al_2O_3$ film 14 via plasma using a gas mixture mainly containing $BCl_3$ and also containing $Cl_2$ and Ar (FIG. 1(*d*)).

2 Claims, 4 Drawing Sheets

(a)

(b)

(c)

(d)

(a)

(b)

(c)

METHOD FOR DRY ETCHING AL$_2$O$_3$ FILM

The present application is based on and claims priority of Japanese patent application No. 2007-249429 filed on Sep. 26, 2007, the entire contents of which are hereby incorporated by reference.

BACKGROUND OF THE INVENTION

1. Field of the Invention

The present invention relates to a method for dry etching a multilayered film, and more specifically, relates to a dry etching method for processing an alumina (Al$_2$O$_3$) film having a thickness of 200 nm to 1000 nm arranged on a nickel chrome (NiCr) alloy film, in which a ruthenium (Ru) film is used as mask to process the Al$_2$O$_3$ film with high selectivity to obtain a perpendicular process shape.

2. Description of the Related Art

When processing Al$_2$O$_3$ films having a thickness of 200 nm to 1000 nm used for forming magnetic heads in a dry etching apparatus, a nonvolatile material such as NiCr alloy film or the like is used as the mask material to achieve the required selectivity. This NiCr alloy film is nonvolatile, and is difficult to process via dry etching, so it is conventionally processed via milling. However, along with the miniaturization of the processing object, milling processes have become more and more difficult due to drawbacks of accuracy and processing rate. Therefore, studies are now being performed to process the mask material and the Al$_2$O$_3$ film via dry etching.

In other words, it is necessary to find a mask material that enables the mask and the Al$_2$O$_3$ film to be dry-etched and has high selectivity with respect to the Al$_2$O$_3$ film.

FIG. 5 is referred to in describing a processing method using an NiCr alloy film as mask material.

FIG. 5(a) is a cross-sectional view of a wafer prior to the etching process. The wafer includes, from the upper layer in the named order, a patterned resist mask 11, an upper layer NiCr alloy film 15, an Al$_2$O$_3$ film 14 and a lower layer NiCr alloy film 15. At first, the milling process of the upper layer NiCr alloy film 15 performed under conditions using a fluorine-based gas causes the surface layer portion of the Al$_2$O$_3$ film 14 to be etched for approximately 80 nm in a tapered shape, and thus, it becomes difficult to fine-process the NiCr alloy film (FIG. 5(b)). Next, when the Al$_2$O$_3$ film 14 is dry-etched in a low pressure range using a gas mixture containing boron trichloride (BCl$_3$), chlorine (Cl$_2$) and argon (Ar), the etching proceeds with the surface layer portion of the Al$_2$O$_3$ film 14 still tapered by the milling process, so the processing shape of the Al$_2$O$_3$ film will be tapered and could not be etched perpendicularly (FIG. 5(c)).

SUMMARY OF THE INVENTION

The object of the present invention is to provide a method for etching thick Al$_2$O$_3$ films used in magnetic heads, wherein the method enables to etch the mask material via dry etching with high etching selectivity.

Furthermore, the present invention provides a method for dry-etching the aforementioned mask material and Al$_2$O$_3$ film.

One characteristic feature of the present invention is to use an Ru film that could be dry-etched using a gas mixture containing Cl$_2$ and O$_2$ as the mask material of the Al$_2$O$_3$ film.

The ruthenium film is dry-etched using a gas mixture containing Cl$_2$ and O$_2$, and the Al$_2$O$_3$ film could be dry-etched using a gas mixture mainly containing BCl$_3$ and also containing Cl$_2$ and Ar.

Moreover, in order to realize fine processing, a BARC film can be deposited as anti reflection film on the upper layer, by which the BARC layer can be trimmed so as to control the wiring dimensions.

According to the present invention, an Ru film is used as the mask material of the Al$_2$O$_3$ film 14 since it has high selectivity, so that the mask material and the Al$_2$O$_3$ film can be processed via dry etching, enabling fine-processing of the Al$_2$O$_3$ film and perpendicular processing of the Al$_2$O$_3$ film.

DETAILED DESCRIPTION OF THE PREFERRED EMBODIMENTS

The present invention enables to dry-etch mask materials and Al$_2$O$_3$ films by selecting Ru films having high selectivity as the mask material for processing thick Al$_2$O$_3$ films used for magnetic heads.

Details on how the mask material was discovered according to the present invention will now be described.

Al$_2$O$_3$ films, or alumina films, can be dry etched using a gas mixture mainly containing BCl$_3$ and further containing Cl$_2$ and Ar, and a known method for etching Al$_2$O$_3$ films realizes main etching and over etching of the Al$_2$O$_3$ film by varying the bias power applied to the sample. The etching rate of the Al$_2$O$_3$ film when bias power is varied was 78.1 nm/min when a low bias of 30 W was applied and 159.8 nm/min when a high bias of 200 W was applied.

The mask material for processing the Al$_2$O$_3$ film must have a high selectivity, which is computed by the aforementioned Al$_2$O$_3$ film etching rate/mask material etching rate.

Figure 2:
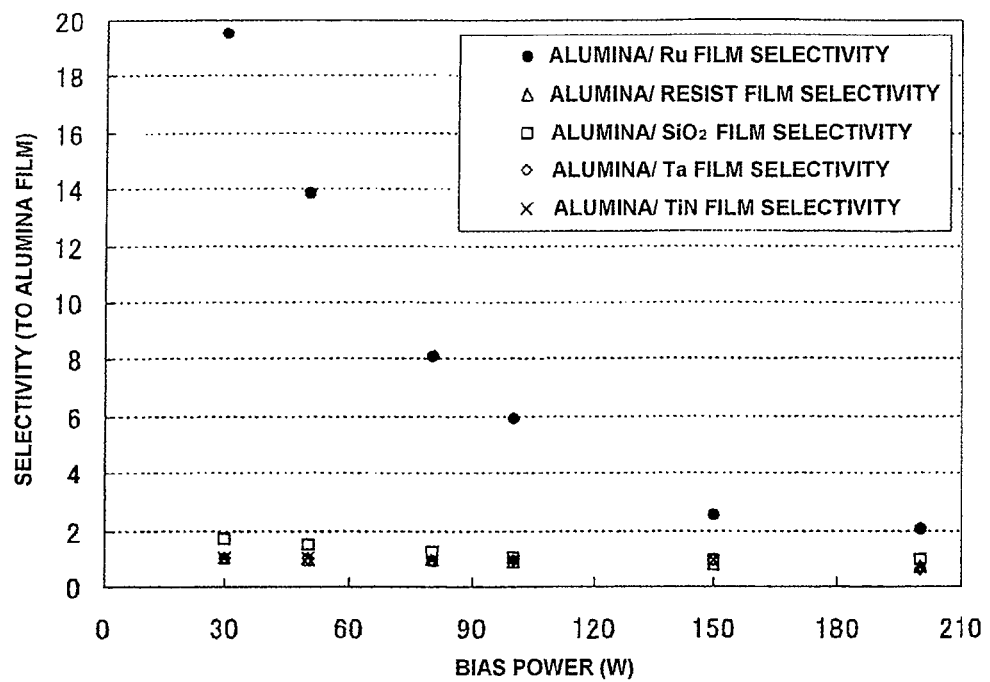
FIG. 2 is a view illustrating the mask material selectivity according to the present invention.

Under the same conditions using the aforementioned gas mixture of BCl$_3$, Cl$_2$ and Ar, the relationship of the selectivities of Al$_2$O$_3$ film to the various materials is shown in FIG. 2.

The selectivity of the Al$_2$O$_3$ film etching rate to mask material etching rate with varied bias power applied was 1.69 or smaller when a resist film, an SiO$_2$ film, a tantalum film or a TiN film was used, and on the other hand, the selectivity of the Al$_2$O$_3$ film etching rate to Ru film etching rate using an Ru film with varied bias power applied was 2.02 when a high bias of 200 W was applied and 19.5 when a low bias of 30 W was applied.

That is, since the resist film, the SiO$_2$ film, the tantalum (Ta) film and the titanium nitride (TiN) film have a low selectivity of 0.63 to 1.69, respectively, with respect to the Al$_2$O$_3$ film, the films must be deposited sufficiently thick as mask material for the Al$_2$O$_3$ film, and the aspect ratio becomes high, so that it becomes difficult to process the Al$_2$O$_3$ film perpendicularly. Therefore, it is difficult to select these materials to form a mask for the thick Al$_2$O$_3$ film.

On the other hand, the Ru film can be dry-etched using a gas mixture of Cl$_2$ and O$_2$, and the etching rate of the Al$_2$O$_3$ film was 2.7 nm/min when bias power of 150 W was applied.

Thus, according to the present invention, the Ru film was selected as the mask material for the $Al_2O_3$ film, since it has high selectivity with respect to the $Al_2O_3$ film and since the etching of the $Al_2O_3$ film, or film to be etched, proceeds very slowly.

Next, the mask material for dry-etching the Ru film was selected. The Ru film can be dry-etched using a gas mixture containing $Cl_2$ and $O_2$. The etching rate of each material was confirmed with a bias power of 150 W applied. At this time, the etching rate of the resist film was 1957.5 nm/min and the etching rate of the $SiO_2$ film was 14.3 nm/min.

Therefore, according to the present invention, a silicon oxide ($SiO_2$) film with a low etching rate was used as the mask material for the Ru film in dry-etching the Ru film using a gas mixture containing $Cl_2$ and $O_2$.

Figure 1:
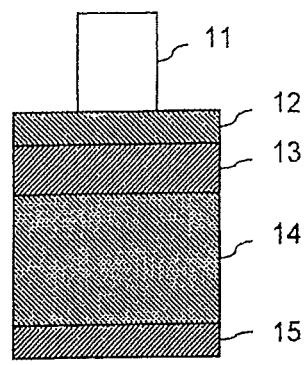
FIGS. 1(a)-(d) are cross-sectional views illustrating an etching method according to a preferred embodiment of the present invention.
Figure 1:
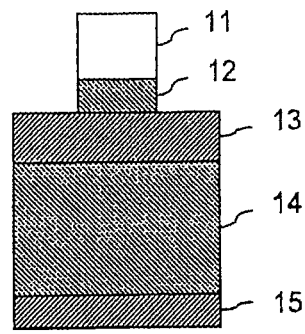
Figure 1:
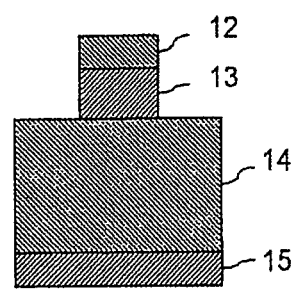
Figure 1:
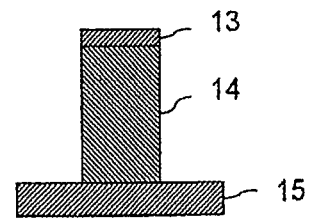

Now, a preferred embodiment of the method for dry-etching the aforementioned $Al_2O_3$ film and the mask material will be described in detail with reference to FIG. 1 illustrating a cross-sectional view of a wafer, or sample.

FIG. 1(a) is a view showing the cross-section of a wafer which is the object of the etching process according to the present invention. The wafer is a multilayered material including, from the upper layer in the named order, a patterned resist mask 11, a hard mask, or $SiO_2$ film, 12 which is the material to be etched, a ruthenium film 13, an $Al_2O_3$ film 14, and an NiCr alloy film 15 which is a base stopper.

The resist film 11 patterned via the dry etching method using a gas containing fluorine is used as a mask to etch the $SiO_2$ film 12 of the above-described wafer. By this process, the $SiO_2$ film 12 is patterned, which constitutes the mask for the Ru film 13 (FIG. 1(b)).

In a second step, the patterned $SiO_2$ film 12 and the patterned resist film 11 are used as a mask to dry-etch the Ru film 13. At this time, by dry-etching the Ru film 13 under conditions using a gas mixture containing $Cl_2$, $O_2$ and Ar, the etching of the lower layer $Al_2O_3$ film 13 proceeds only very slowly, so the etching process could be performed realizing a substantially perpendicular taper angle of the side surface of the Ru film 13 and the surface of the $Al_2O_3$ film 14 (FIG. 1(c)).

In a third step, the patterned Ru film 13 and the patterned $SiO_2$ film 12 formed in the second step is used as a mask to etch the $Al_2O_3$ film 14. At this time, by dry-etching the $Al_2O_3$ film under conditions using a gas mixture mainly containing $BCl_3$ and also containing $Cl_2$ and Ar, the $Al_2O_3$ film 14 could be processed perpendicularly using the perpendicularly processed Ru mask 13 (FIG. 1(d)).

The dry etching of the $Al_2O_3$ film in the third step is performed under the following conditions: a ratio of $BCl_3:Cl_2:Ar=40:10:50$, a pressure in the low pressure range of 0.3 Pa to 0.8 Pa, and a wafer temperature of 300 degrees or lower which does not cause burning of resist.

Moreover, the tapered angle of the processed shape can be approximated to a perpendicular shape by increasing the bias power and increasing the wafer temperature.

Figure 3:
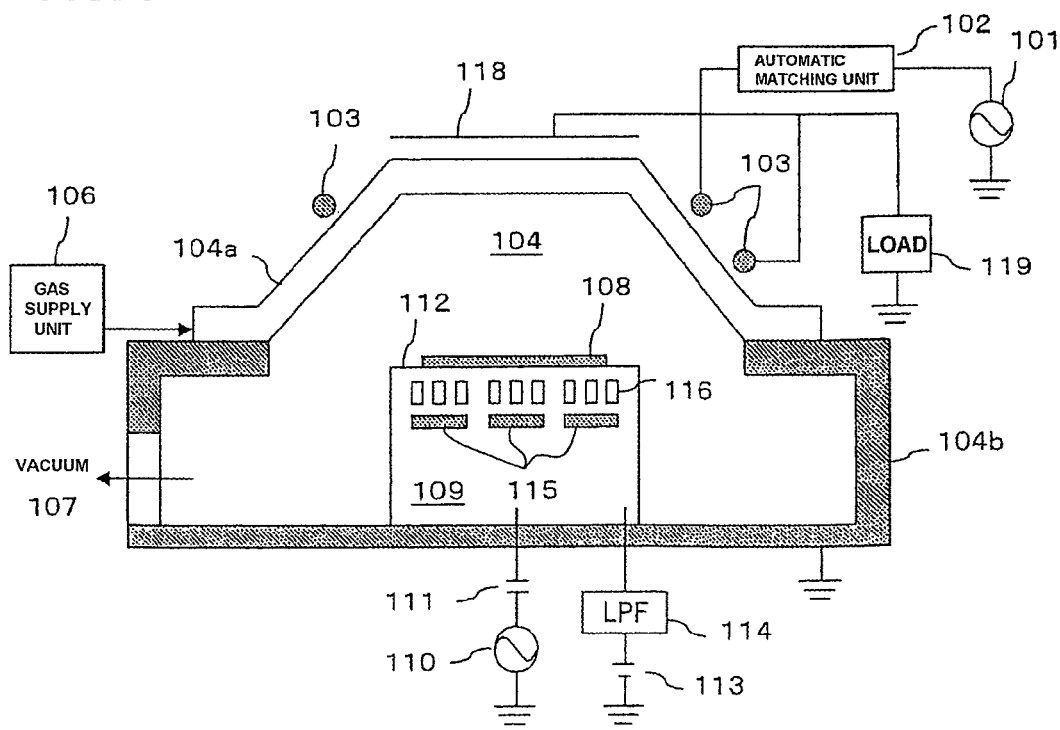
FIG. 3 is a cross-sectional view showing the configuration of an etching apparatus.

FIG. 3 is used to describe an example of the structure of a plasma etching apparatus to which the present invention is applied. In FIG. 3, the plasma etching apparatus includes a high-frequency power supply 101, an automatic matching unit 102, an inductively-coupled coil 103, a vacuum reactor 104, a gas supply unit 106, a vacuum pump 107, a sample stage 109, a bias power supply 110, a high-pass filter 111, a direct current power supply 113, and a low-pass filter 114. The vacuum reactor 104 includes a discharge unit 104a formed of an insulating material and a grounded processing unit 104b. An insulating film 112 formed for example of ceramics is arranged on the surface of the sample stage 109, wherein a heater 115 and a refrigerant flow path 116 is disposed therein so as to control the temperature of a sample 108 to thereby control the processing thereof. Further, an antenna 118 connected to a high-frequency power supply 101 is arranged on the upper portion of the discharge unit 104a in the atmospheric area, which is connected via a load.

The plasma etching apparatus supplies high frequency current to the inductively coupled coil 103 from the high-frequency power supply 101 via the automatic matching unit 102, and causes plasma to be generated in the vacuum reactor 104. The vacuum reactor 104 includes a discharge unit 104a formed of an insulating material and a grounded processing unit 104b. Etching gases such as $Cl_2$ and $BCl_3$ are introduced via the gas supply unit 106 to the vacuum reactor 104, and the gases are then evacuated through the vacuum pump 107.

A sample 108 is placed on the sample stage 109. In order to increase the energy of ions being incident on the sample 108, a bias power supply 110 which is a second high-frequency power supply is connected to the sample stage 109 via a high-pass filter 111. An insulating film 112 formed for example of ceramics is arranged on the surface of the sample stage 109. Further, a direct current power supply 113 is connected to the sample stage 109 via a low-pass filter 114, which holds the sample 108 onto the sample stage 109 via electrostatic chuck.

Further, a heater 115 and a refrigerant flow path 116 are provided in the sample stage 109 so as to control the temperature of the sample 108 and thereby control the processing thereof.

The plasma generating mechanism of the plasma etching apparatus for carrying out the present invention is not restricted to an inductively-coupled plasma, and other low-pressure plasma generating mechanisms can be used. For example, the present invention can be applied for example to apparatuses having an ECR (electron cyclotron resonance) plasma generating mechanism, a magnetron RIE plasma generating mechanism or a helicon wave plasma generating mechanism.

The $SiO_2$ film 12, the Ru film 13 and the $Al_2O_3$ film 14 can be processed consistently in the same chamber. It is also possible to use separate chambers for etching the $SiO_2$ film 12 and Ru film 13 and for etching the $Al_2O_3$ film.

Next, the second embodiment of the present invention will be described with reference to FIG. 4. The second embodiment is an example in which a BARC is disposed between the resist mask and the $SiO_2$ hard mask in the wafer structure shown in FIG. 1. FIG. 4(a) is a view showing the cross-section of a wafer which is the object of the etching process according to the present invention. The wafer is a multilayered material including, from the upper layer in the named order, a patterned resist mask 11, a BARC film 16 which is an anti reflection film, a hard mask, or $SiO_2$ film, 12 which is the material to be etched, an Ru film 13, an $Al_2O_3$ film 14, and an NiCr film 15 which is abase stopper.

Figure 4:
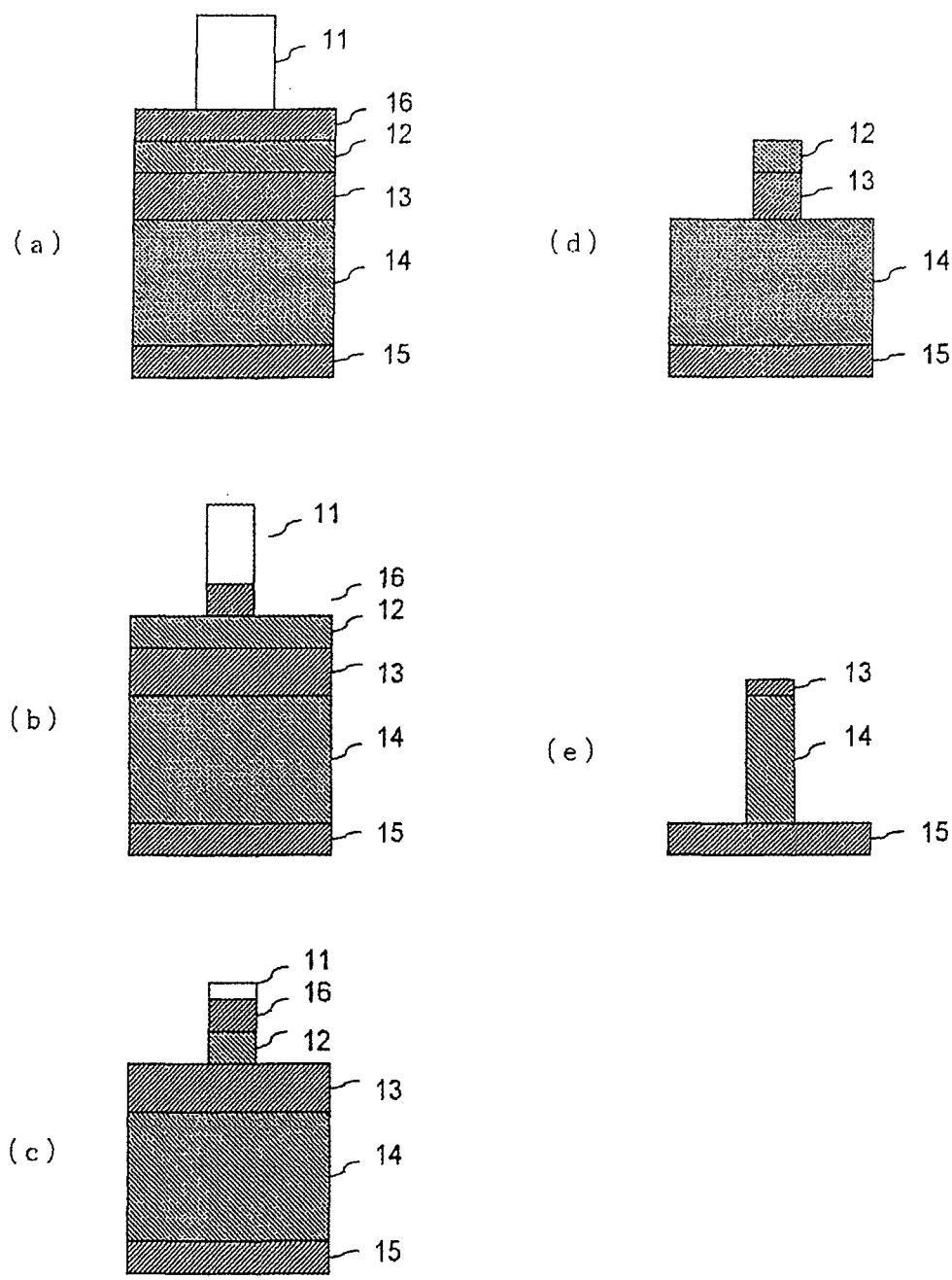
FIGS. 4(a)-(e) are cross-sectional views illustrating an etching method according to a preferred embodiment of the present invention.
Figure 5:
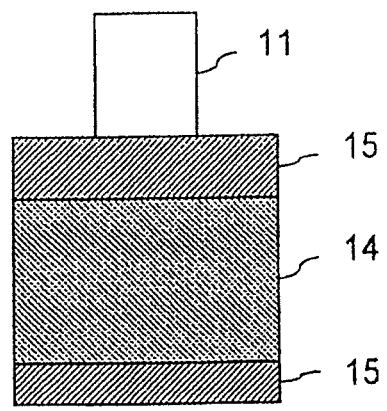
FIGS. 5(a)-(c) are cross-sectional views illustrating an etching method according to the prior art.
Figure 5:
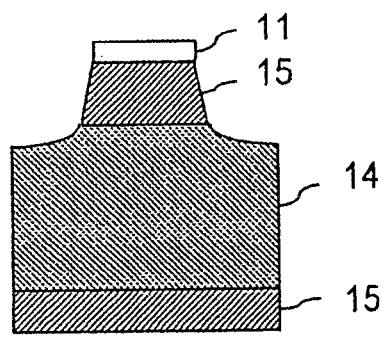
Figure 5:
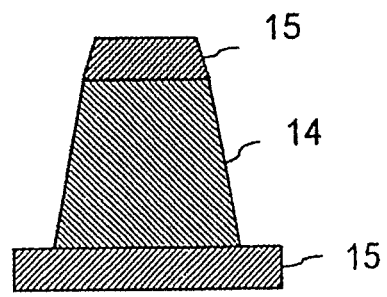

As the first step, the BARC film 16 is etched using fluorine-based gas, by which the BARC film 16 is trimmed, and the wiring dimension can be controlled (FIG. 4(b)). Thereafter, the resist film 11 and the BARC film 16 patterned via the dry etching method using gas containing fluorine is used as a mask to etch the $SiO_2$ film 12. By this process, the BARC film 16 and the $SiO_2$ film 12 are patterned, creating a mask for the Ru film 13 (FIG. 4(c)). Then, the resist mask 11, the BARC film 16 and the $SiO_2$ film 12 are used as a mask to dry-etch the Ru film 13. At this time, by dry-etching the Ru film 13 using a gas mixture containing $Cl_2$ and $O_2$, the etching of the lower $Al_2O_3$ film 13 layer proceeds only very slowly, so the etching process could be performed realizing a substantially perpendicular taper angle of the side surface of the Ru film 13 and the surface of the $Al_2O_3$ film 14 (FIG. 4(*d*)). The resist 11 and the BARC film 16 arranged above the $SiO_2$ film 12 are removed during this process.

The patterned Ru film 13 and the patterned $SiO_2$ film 12 formed during etching of the Ru film 13 are used as the mask to etch the $Al_2O_3$ film 14. At this time, by dry-etching the $Al_2O_3$ film using a gas mixture mainly containing $BCl_3$ and also containing $Cl_2$ and Ar, the $Al_2O_3$ film 14 could be processed perpendicularly using the perpendicularly processed Ru mask 13 (FIG. 4(*e*)). The dry etching of the $Al_2O_3$ film according to this process is performed under the following conditions: a ratio of $BCl_3:Cl_2:Ar=40:10:50$, a pressure in the low pressure range of 0.3 Pa to 0.8 Pa, and a wafer temperature of 300 degrees or lower which does not cause burning of the resist.

What is claimed is:

1. A method for dry etching an $Al_2O_3$ film which has a thickness of 200 nm to 1,000 nm, and is arranged on a nickel chrome alloy film of a sample having a ruthenium film arranged on the $Al_2O_3$ film, comprising the steps of:

dry etching the ruthenium film using a gas mixture containing $Cl_2$ $O_2$ and Ar, so as to form an etched ruthenium film; and dry etching the $Al_2O_3$ film, using a gas mixture containing $BCl_3$, $Cl_2$ and Ar, so as to form at etched $Al_2O_3$ film, wherein the ruthenium film is dry etched using a patterned silicon oxide film and a patterned resist film as a mask, so as to form the etched ruthenium film; and wherein the $Al_2O_3$ film is dry etched using a patterned ruthenium film and the patterned silicon oxide film as a mask, so as to form the etched $Al_2O_3$ film.

2. The method for dry etching an $Al_2O_3$ film according to claim 1, wherein the etched ruthenium film is the patterned ruthenium film used in providing the mask for dry etching the $Al_2O_3$ film.

* * * * *